(12) United States Patent
Dai et al.

(10) Patent No.: US 9,603,219 B2
(45) Date of Patent: Mar. 21, 2017

(54) DRIVING POWER SUPPLY APPARATUS FOR OLED

(71) Applicant: SHENZHEN SKYWORTH-RGB ELECTRONIC CO., LTD, Shenzhen (CN)

(72) Inventors: Qifeng Dai, Shenzhen (CN); Tieniu Chao, Shenzhen (CN); Shengping Cai, Shenzhen (CN); Hui Xu, Shenzhen (CN); Zongwang Wei, Shenzhen (CN)

( * ) Notice: Subject to any disclaimer, the term of this patent is extended or adjusted under 35 U.S.C. 154(b) by 0 days.

(21) Appl. No.: 14/770,051

(22) PCT Filed: Sep. 22, 2014

(86) PCT No.: PCT/CN2014/087027
§ 371 (c)(1),
(2) Date: Aug. 24, 2015

(87) PCT Pub. No.: WO2015/139437
PCT Pub. Date: Sep. 24, 2015

(65) Prior Publication Data
US 2017/0006688 A1    Jan. 5, 2017

(30) Foreign Application Priority Data
Mar. 18, 2014 (CN) .......................... 2014 1 0099656

(51) Int. Cl.
*H05B 33/08* (2006.01)
*G09G 3/36* (2006.01)
(Continued)

(52) U.S. Cl.
CPC ....... *H05B 33/0896* (2013.01); *G09G 3/2003* (2013.01); *H02M 1/08* (2013.01);
(Continued)

(58) Field of Classification Search
CPC ..... H02M 2001/0032; H02M 3/33546; H02M 3/3376; H02M 1/42; H02M 3/285;
(Continued)

(56) References Cited

U.S. PATENT DOCUMENTS 5,910,891 A * 6/1999 Jo ....................... H02M 1/4225
                                                    323/207
7,558,083 B2 * 7/2009 Schlecht ............... H02M 3/335
                                                    363/21.06
(Continued)

*Primary Examiner* — Vibol Tan
(74) *Attorney, Agent, or Firm* — James M. Smedley LLC; James Michael Smedley, Esq.

(57) ABSTRACT

The present invention discloses a driving power supply apparatus for OLED. Wherein it comprises a power board connecting to a motherboard and a OLED screen, the motherboard comprises a standby circuit, a timing control module, a first and second transformer modules and a PFC circuit, the standby circuit connects to the timing control module and the motherboard, the timing control module connects to the PFC circuit, the motherboard and the first and second transformer modules, which connect to the motherboard and the PFC circuit. The isolation of two voltages, fulfills stability requirements of the power supplied to OLED, improves its picture quality; the timing control module will not light up the OLED screen until both switch and enable signals are stable simultaneously. This has changed the traditional power switch sequence, and made the power supply adapt to OLED's fast response characters.

14 Claims, 7 Drawing Sheets

(51) Int. Cl.
*H02M 3/04* (2006.01)
*H05B 37/02* (2006.01)
*H02M 1/42* (2007.01)
*H02M 7/04* (2006.01)
*H02M 1/08* (2006.01)
*G09G 3/20* (2006.01)
*H02M 1/00* (2006.01)

(52) U.S. Cl.
CPC .............. *H02M 1/42* (2013.01); *H02M 7/04* (2013.01); *H05B 37/0281* (2013.01); *H02M 2001/0032* (2013.01)

(58) Field of Classification Search
CPC ....... H02M 1/08; H02M 7/04; Y02B 70/1475; Y02B 70/1433; Y02B 20/346; Y02B 60/1242; Y02B 70/12; G09G 2330/021; G09G 3/3208; G09G 3/3406; G09G 2320/029; G09G 2320/041; Y10T 307/406; Y10T 307/305; Y10T 307/707; H05B 33/0896; H05B 33/0815; H05B 41/2828; H05B 41/3927; H05B 37/0281; G06F 1/26; G06F 1/3265; H02J 9/005; H02J 1/102
See application file for complete search history.

(56) References Cited

U.S. PATENT DOCUMENTS

| | | | | |
|---|---|---|---|---|
| 7,804,480 B2* | 9/2010 | Jeon | ................. | G02F 1/133603 345/102 |
| 8,238,121 B2* | 8/2012 | Torrico-Bascope | | H02M 3/33592 363/21.02 |
| 8,296,587 B2* | 10/2012 | Paniagua, Jr. | ............ | G06F 1/26 307/154 |
| 8,368,252 B2* | 2/2013 | Pabon | ................... | H02M 7/219 307/31 |
| 9,143,042 B2* | 9/2015 | Schlecht | ............... | H02M 3/335 |
| 9,354,743 B2* | 5/2016 | Sharma | ................ | G06F 3/0416 |
| 2003/0015998 A1* | 1/2003 | Takahashi | ............... | H02M 1/36 323/267 |
| 2005/0017922 A1* | 1/2005 | Devos | ................. | G09G 3/3216 345/6 |
| 2008/0218503 A1* | 9/2008 | Lee | ......................... | H02M 1/42 345/211 |
| 2013/0169180 A1* | 7/2013 | Park | ................... | H05B 33/0896 315/206 |
| 2013/0169695 A1* | 7/2013 | Hyeon | ................. | G09G 3/3208 345/690 |

* cited by examiner

DRIVING POWER SUPPLY APPARATUS FOR OLED

CROSS-REFERENCES TO RELATED APPLICATIONS

This application is a continuation application of PCT Patent Application No. PCT/CN2014/087027, filed on Sep. 22, 2014, which claims priority to Chinese Patent Application No. 201410099656.3 filed on Mar. 18, 2014. The content of all of which is incorporate herein by reference.

FIELD OF THE INVENTION

The present invention relates to the field of technologies on power supplies, and more particularly, to a driving power supply apparatus for OLED.

BACKGROUND

The conventional OLED (Organic Light Emitting Diode) technology has many special characters, including self emitting, simple structure, ultrathin, wide viewing angles, low power consumption as well as flexible displays and more. In many aspects, including picture quality, response speed, power consumption, thickness and viewing angles, it is better than traditional LCDs (Liquid Crystal Display) and LEDs (Light-Emitting Diode). Also, OLED's display mode is different to that of a traditional LCD, since OLED is adopting very thin layers of organic materials and glass plates, no backlight, color filter, or liquid crystal needed, as long as any electric currents are passing through, the organic materials (that is, the organic thin layer) will emit light. Thus, in recently years, OLED research spreads into a hot topic among all leading global displayer manufacturers in a fast speed. Following the maturation of OLED technologies, displayers with OLED screens (such as TV sets, monitors, projectors and more.) will gradually substitute those with traditional LCD screens and LED screens. However, a power supply module with a stable performance and high efficiency is the key factor for OLED displayers to work stably thus reflects their practical values.

Taking an intelligent TV set for example. In prior arts, in power supply designs for intelligent TV sets, each of the different screen sizes and different power consumptions for the whole set requires different power supply architectures. Usually, such a power supply needs to output both a +12V voltage and a +24V voltage. In a traditional power board, the transformation and output of both +12V voltage and +24V voltage are sharing the same voltage transformer. For example, as shown in FIG. 1, two different windings in the same transformer are outputting a +12V voltage and a +24V voltage, respectively. In FIG. 2, the same winding of a transformer outputs a +24V voltage while also outputs a +12V voltage from its center. When an ON/OFF signal arrives from outside, turning on (or off) the device, the Pulse-Width Modulation (PWM) circuit will be controlled to start to work, then the rectified DC current (that is, the current for input, as shown in FIGS. 1 and 2) will be transformed into +12V and +24V voltages for output, by a transformer. However, when the output power is large, due to sharing the same transformer, the two different output voltages, +12V voltage and +24V voltage, could affect each other, and make the power output unstable thus cause unpredictable results, which extends the period of R&D as well as debug processes. Also, the design of sharing the same transformer increases the burden of adjusting the circuit, while also increases the loss in the power board, thus it decreases the output efficiency. In extreme cases, this could even affect the working stability of the whole device and reduce the service life. Also, sharing one transformer requires a stricter process design. Since the work principle of OLED is that, an organic thin film is driven by a current then emits light, thus its response speed is much faster than that of a LED, and any changes of picture colors on screen will result in fast changes in electric current, so, if sharing one transformer, the fast changing current could affect the output of +12V voltage, then unpredictable results could appear, which eliminates the stability of the system, and brings difficulties to the processes of R&D and debug, thus extends the study period; Also, tiny current fluctuations could eliminate the picture quality and even the service life of an OLED displayer. Thus, stricter requirements on power output, especially on the stability of the electric current are required.

In addition, a displayer based on OLED technology owns a faster response speed comparing to other display methods. In a traditional power source architecture, both +12V voltage and +24V voltage have the same timing sequences, when the power is on or off, shown as FIG. 3. When a switch signal ON/OFF is sent to the power board, both +12V voltage and +24V voltage transforms will be turned on or off at the same time. As shown in FIG. 3, at the time point T1, the curves of +12V voltage, +24V voltage and a switch signal ON/OFF will rise at the same time (i.e., turned on); at time point T2, the curves of +12V voltage, +24V voltage and the power switch signal ON/OFF will decline at the same time (i.e., turned off). In these cases, the effects of fast response character of OLED could cause some unpredictable failures including blurred screens and more, thus a traditional power supply design is hard to fulfill the requirements of an OLED screen.

BRIEF SUMMARY OF THE DISCLOSURE

The present invention discloses a driving power supply apparatus for OLED comprising a power board connecting to a motherboard and an OLED screen, wherein, the power board includes: a standby circuit, a timing control module, a first transformer module, a second transformer module and a PFC circuit.

The standby circuit is configured to output a power at supply voltage to the motherboard then supply the timing control module after connected to a power source outside; the timing control module turns on the PFC circuit based on a switch signal fed back from the motherboard; the PFC circuit outputs a high voltage direct current (HVDC) to the timing control module, the first transformer module and the second transformer module; the timing control module then turns on the first transformer module and the second transformer module, based on the HVDC signals output from the PFC circuit and an enable signal, wherein, the first transformer module is configured to convert the HVDC into a first voltage and supplies to the motherboard, and the second transformer module is configured to convert the HVDC into a second voltage then supplies to the motherboard and the OLED screen; the timing control module also controls the start sequences of both the first transformer module and the second transformer module, then lights the OLED screen up after both switch signals and enable signals are stable concurrently.

The driving power supply apparatus for OLED, wherein, the timing control module includes:

A switch timing control circuit, configured to output a first power to turn on the PFC circuit based on switch signals fed back from the motherboard, then output a second power for power supplies, to the first transformer module and an enable control circuit, based on the HVDC output from the PFC circuit;

An enable control circuit, configured to output a third power to the second transformer module for power supply, based on enable signals fed back from the motherboard;

The switch timing control circuit connects to the PFC circuit, the enable control circuit, the first transformer module and the motherboard, while the enable control circuit connects to the second transformer module.

The driving power supply apparatus for OLED, wherein, the first transformer module includes:

A first PWM controller, configured to turn on the first transformer, based on the second power output from the switch timing control circuit.

A first transformer, configured to convert the HVDC output from the PFC circuit into the first voltage, and output to the motherboard for power supply.

The first transformer connects to the first PWM controller and the motherboard, while the first PWM controller connects to the timing control module.

The driving power supply apparatus for OLED, wherein, the second transformer module includes:

A second PWM controller, configured to start the second transformer, based on the third power output from the enable control circuit.

A second transformer, configured to convert the HVDC output from the PFC circuit into the second voltage, and output to the motherboard for power supply.

The second transformer connects to the second PWM controller and the motherboard, while the second PWM controller connects to the timing control module.

The driving power supply apparatus for OLED, wherein, the standby circuit is also configured to output a working voltage to the switch timing control circuit, after connected to a power; the switch timing control circuit includes:

A first power controller sub circuit, configured to convert a working voltage output from the standby circuit into the first power and turn on the PFC circuit, based on the switch signals fed back from the motherboard.

A second power controller sub circuit, configured to convert the working voltage into the second power and supplies to the enable control circuit and the first transformer module, based on the HVDC output from the started PFC.

The first power controller sub circuit connects to the standby circuit, the motherboard, the PFC circuit and the second power controller sub circuit, while the second power controller sub circuit connects to the PFC circuit, the enable control circuit and the first transformer module.

The driving power supply apparatus for OLED, wherein, the first power controller sub circuit includes: a first triode, a second triode, a third triode, a first opticalcoupler (OC), a first resistor, a second resistor, a third resistor, a fourth resistor, a first diode and a second diode; the base electrode of the first triode connects to the motherboard, the emitter electrode of the first triode gets ground connected, and the collector electrode of the triode connects to the second pin of the first OC, while the first pin of the first OC connects to the standby circuit, the fourth pin of the first OC connects to the standby circuit and the collector electrode of the second triode, the third pin of the first OC connects to one end of the first resistor, while the other end of the first resistor connects to the base electrode of the second triode and the cathode of the first diode, as well as getting ground connected through the second resistor, the anode of the first diode gets ground connected, the emitter electrode of the second triode connects to the collector electrode of the third triode, one end of the third resistor and the second power controller sub circuit, the other end of the third resistor connects to the base electrode of the third triode, the cathode of the second diode, and gets ground connected through the fourth resistor, the anode of the second diode is ground connected, the emitter electrode of the third triode connects to the PFC circuit.

The driving power supply apparatus for OLED, wherein, the second power controller sub circuit includes: a fourth triode, a shunt voltage reference regulator and a resistance voltage divider (RVD) group; the base electrode of the fourth triode connects to the negative electrode of the shunt voltage reference regulator, the collector electrode of the fourth triode connects to the enable control circuit, the first transformer module and the controller electrode of the shunt voltage reference regulator, the emitter electrode of the fourth triode connects to the first power controller sub circuit, the positive electrode of the shunt voltage reference regulator gets ground connected, the first end of the RVD group connects to the PFC circuit, and the second end of the RVD group connects to the controller electrode of the shunt voltage reference regulator, the third end of the RVD group gets ground connected.

The driving power supply apparatus for OLED, wherein, the first power controller sub circuit also includes: a third diode, a fifth resistor, a sixth resistor, a first capacitor and a seventh resistor; the anode of the third diode connects to the motherboard, and the cathode of the third diode connects to one end of the fifth resistor, while the other end of the fifth resistor connects to the base electrode of the first triode, and gets ground connected through the sixth resistor, the first capacitor and the sixth resistor connects in parallel, the seventh resistor connects in between the standby circuit and the first pin of the first OC.

The driving power supply apparatus for OLED, wherein, the second power controller sub circuit also includes an eighth resistor and a ninth resistor; one end of the eighth resistor connects to the emitter electrode of the fourth triode, while the other end of the eighth resistor connects to the negative electrode of the shunt voltage reference regulator and one end of the ninth resistor, while the other end of the ninth resistor connects to the base electrode of the fourth triode.

The driving power supply apparatus for OLED, wherein, the second power controller sub circuit also includes a fourth diode, a tenth resistor, a fifth diode and a fourth capacitor; the cathode of the fourth diode connects to the enable control circuit and the first transformer module, the anode of the fourth diode connects to the collector electrode of the fourth triode and the anode of the fifth diode through the tenth resistor, the cathode of the fifth diode connects to the controller electrode of the shunt voltage reference regulator, the fourth capacitor connects in between the controller electrode and the ground electrode of the shunt voltage reference regulator.

The driving power supply apparatus for OLED, wherein, the second power controller sub circuit also includes a fifth capacitor, an eleventh resistor and a sixth diode; the fifth capacitor connects to the second end of the RVD group, the cathode of the sixth diode connects to the controller electrode of the shunt voltage reference regulator, and the anode of the sixth diode connects to the second end of the RVD group through the eleventh resistor.

The driving power supply apparatus for OLED, wherein, the enable control circuit includes a fifth triode, a sixth triode, a second OC, a twelfth resistor, a thirteenth resistor and a seventh diode; the base electrode of the fifth triode connects to the motherboard, the emitter electrode of the fifth triode gets ground connected, and the collector electrode of the fifth triode connects to the second pin of the second OC, the first pin of the second OC connects to the standby circuit, the fourth pin of the second OC connects to the second power controller sub circuit and the collector electrode of the sixth triode, the third pin of the second OC connects to one end of the twelfth resistor, while the other end of the twelfth resistor connects to the base electrode of the sixth triode, the cathode of the seventh diode, and gets ground connected through the thirteenth resistor; the anode of the seventh diode gets ground connected, the emitter electrode of the sixth triode connects to the second transformer module.

Comparing to the prior art, the driving power supply apparatus for OLED disclosed in the present invention, converts the HVDC into the first voltage to supply the motherboard through the first transformer module, and converts the HVDC into the second voltage to supply the motherboard and OLED screen through the second transformer, thus separates the first voltage and the second voltage from each other, and avoids the existing situation of circuit interferences and impacts caused by sharing the same transformer in the power source architecture, fulfills the stability requirements of OLED to power output, and improves the picture quality of OLED; meanwhile, both start sequences of the first transformer module and the second transformer module are controlled by the timing control module, the OLED screen will not be lit up until both the switch signals and the enable signals are stable at the same time, which changes the switch time sequence of a traditional power, and makes the power adapt to the fast response character of OLED, solves the problem of blurred screen caused by switching at the same time following the prior switch sequence.

DETAILED DESCRIPTION

The present invention provides a driving power supply apparatus for OLED, in order to make the purpose, technical solution and the advantages of the present invention clearer and more explicit, further detailed descriptions of the present invention are stated here, referencing to the attached drawings and some embodiments of the present invention. It should be understood that the detailed embodiments of the invention described here are used to explain the present invention only, instead of limiting the present invention.

Figure 1:
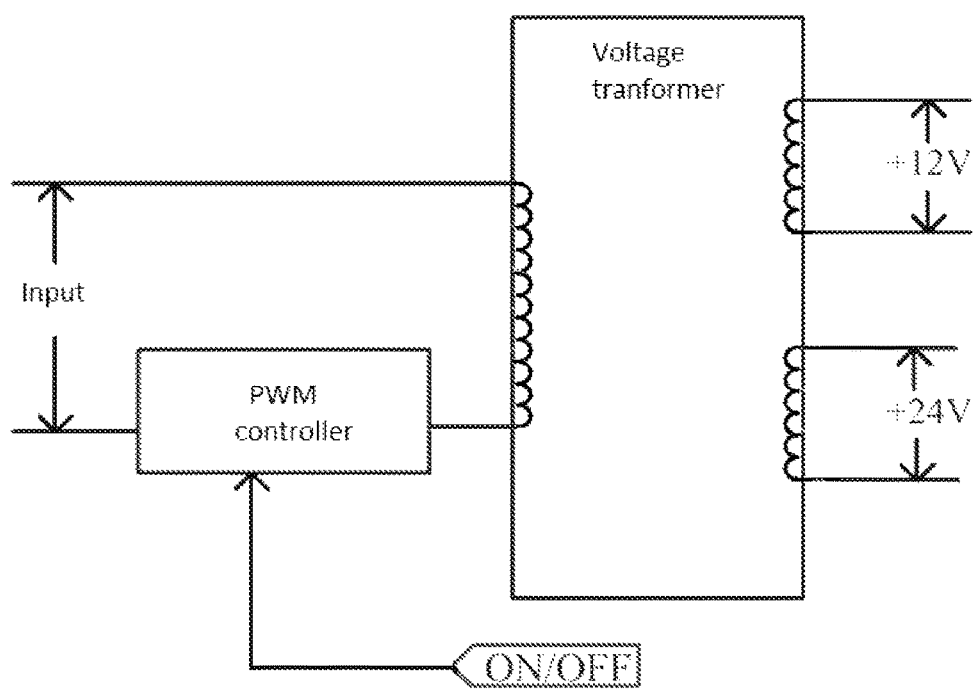
FIG. 1 illustrates a schematic diagram of different voltages output from different windings in a same transformer in a conventional power source architecture.
Figure 2:
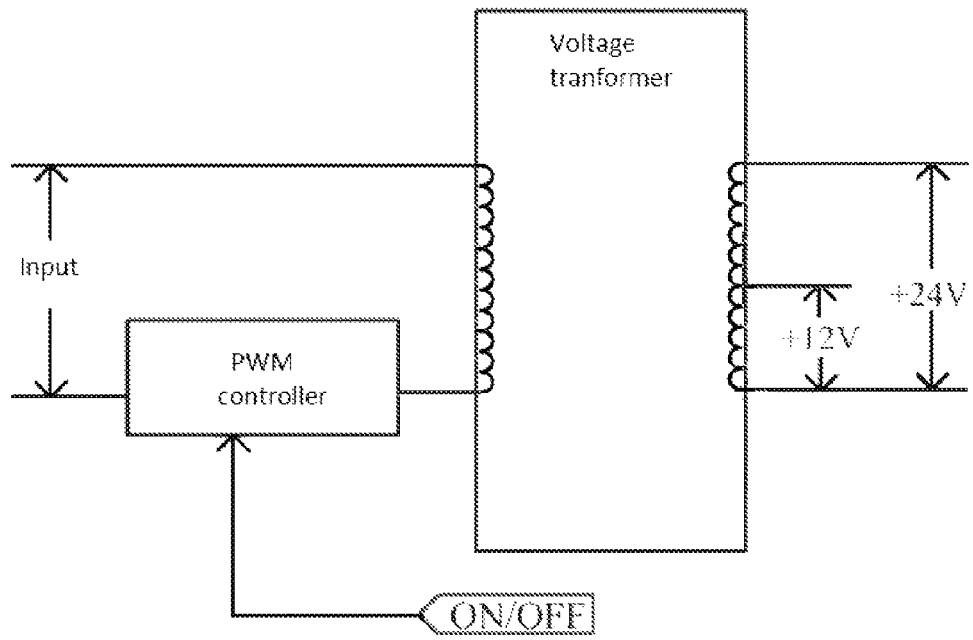
FIG. 2 illustrates a schematic diagram of different voltages output from same winding in a same transformer in a conventional power source architecture.
Figure 3:
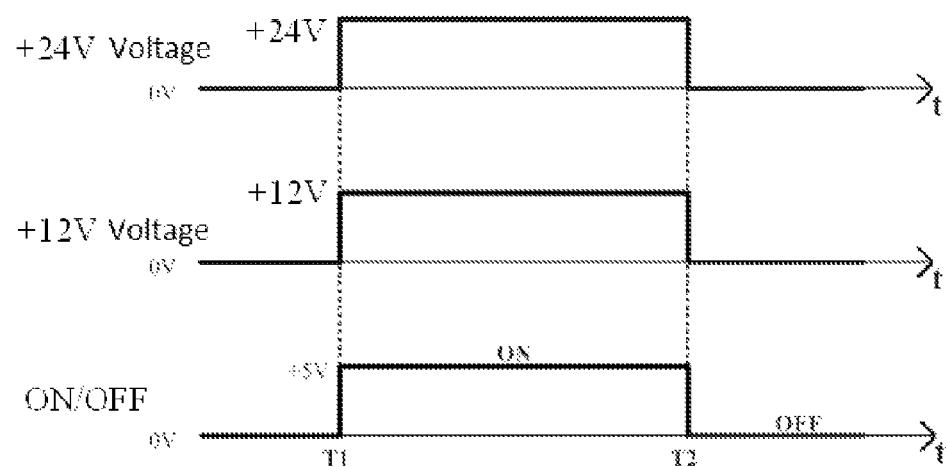
FIG. 3 illustrates the schematic diagram of power switch time sequence in a conventional power architecture.
Figure 4:
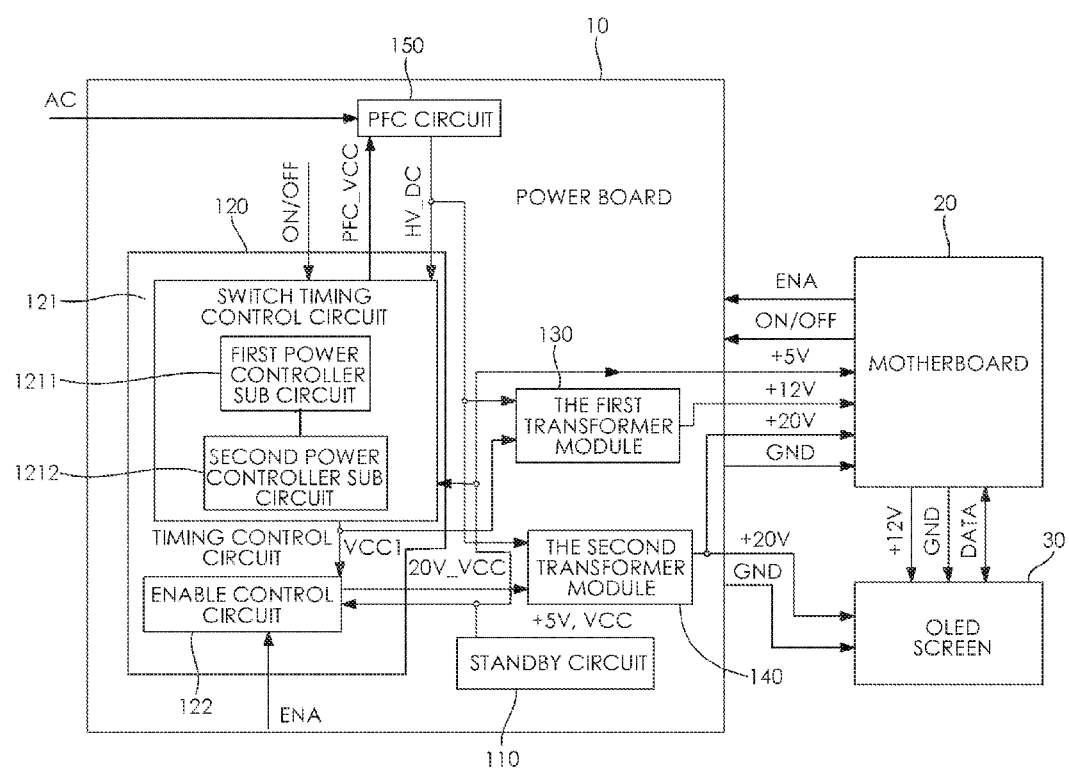
FIG. 4 illustrates the schematic diagram of an embodiment of a driving power supply apparatus for OLED as provided in the embodiment in the present invention.

The driving power supply apparatus for OLED, as provided in the present invention, suitable for the power driving for those devices adopting OLED (Organic Light Emitting Diode) as the displayer, including TV sets, Monitors, Audio-visual education systems, Rear projection display systems, Plasma display panels and more. Referencing to FIG. 4, the driving power supply apparatus for OLED, as provided in the present invention, comprises a power board 10, connecting to a motherboard 20 and a OLED screen 30. The power board 10 comprises a standby circuit 110, a timing control module 120, a first transformer module 130, a second transformer module 140 and a PFC circuit 150. The standby circuit 110 connects to the timing control module 120 and the motherboard 20, and outputs a voltage equaling to the supply voltage (5V in the present embodiment), to a CPU in the motherboard 20 and the timing control module 120 for power supply, making the CPU work normally. The timing control module 120 connects to the PFC circuit 150, the motherboard 20, the first transformer module 130 and the second transformer module 140, the timing control module 120 turns on the PFC circuit 150 based on a switch signals ON/OFF fed back from the CPU. When the PFC circuit 150 starts to work, it outputs a high-voltage direct current HV_DC to the timing control module, the first transformer module and the second transformer module. The timing control module 120 turns on the first transformer module 130 and the second transformer module 140, based on the high voltage direct current HV_DC and an enable signal ENA, then control the start sequence of both the first transformer module 130 and the second transformer module 140, and light the OLED screen up after both the switch signal ON/OFF and the enable signal ENA are stable concurrently. Both the first transformer module 130 and the second transformer module 140 are connecting to the motherboard 20 and PFC circuit 150. The first transformer module 130 converts the high voltage direct current HV_DC into the first voltage (It is +12V in the present embodiment) and supplies to the motherboard 20, after turned on. The second transformer module 140 converts the high voltage direct current HV_DC into the second voltage (It is +20V in the present embodiment) and supplies to the motherboard 20 and OLED screen 30, after turned on.

Wherein, the timing control module 120 includes a switch timing control circuit 121 and an enable control circuit 122; the switch timing control circuit 121 connects to the PFC circuit 150, the enable control circuit 122, the first transformer module 130 and the motherboard 20, the enable control circuit 122 connects to the second transformer module 140. The switch timing control circuit 121 outputs a first power PFC_VCC and turns on the PFC circuit 150, based on the switch signal ON/OFF fed back from the motherboard, then based on the high voltage direct current HV_DC output from the PFC circuit 150, outputs a second power VCC1 to the enable control circuit 122 and the first transformer 130 for power supply. The enable control circuit 122 outputs a third power 20V_VCC to the second transformer module 140 for power supply, based on the enable signal ENA fed back from the motherboard.

In an specific implement, the standby circuit outputs a working voltage (around 25V) to the switch timing control circuit, after connecting to the power, which is a power source to convert into the first power PFC_VCC and the second power VCC1. Referencing to FIG. 4 again, the switch timing control circuit, in details, comprises a first power controller sub circuit 1211 and a second power controller sub circuit 1212. The first power controller sub circuit 1211 connects to the standby circuit 110, the motherboard, the PFC circuit 150 and the second power controller sub circuit 1212, while the second power controller sub circuit 1212 connects to the PFC circuit 150, the enable control circuit 122 and the first transformer 130

Figure 5:
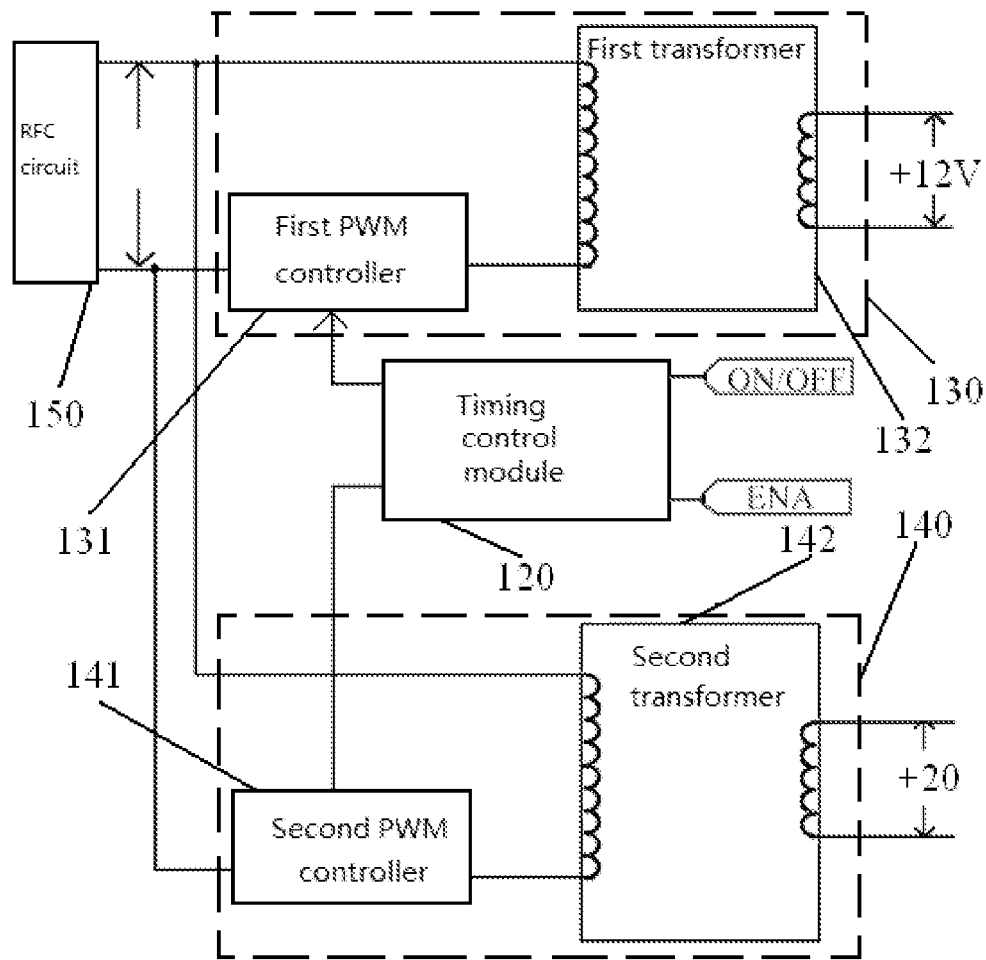
FIG. 5 illustrates the block diagram of a preferred embodiment of a power board as provided in the present invention.

The first power controller sub circuit 1211 converts a working voltage VCC output from the standby circuit 110 into the first power PFC_VCC to turn on the PFC circuit 150, based on the switch signals fed back from the motherboard. The second power controller sub circuit 1212 converts the working voltage VCC into the second power VCC1 and supplies it to the enable control circuit and the first transformer module, based on the high voltage direct current, HV_DC, output from the started PFC 150. In order to solve the problem of hurting the power stability due to sharing the transformer in the prior power source architectures, the present embodiment adopts independent transformers and independent PWM controllers to convert the HVDC into independent +12V voltage and +20V voltage for output. Referencing together with FIG. 5, the first transformer module 130 contains a first PWM controller 131 and a first transformer 132; the second transformer module 140 contains a second PWM controller 141 and a second transformer 142.

The first PWM controller 131 connects to the timing control module, turns on the first transformer 132 based on the second power VCC1 output from the switch timing control circuit; the first transformer 132 connects to the first PWM controller 131 and the motherboard 20, converts the high voltage direct current, HV_DC, output from the PFC circuit, into the first voltage (i.e., +12V), and outputs to the motherboard for power supply.

The second PWM controller 141 connects to the timing control module, turns on the second transformer 142 based on the third power 20V_VCC output from the enable control circuit; the second transformer 142 connects to the second PWM controller 141 and the motherboard 20, converts the high voltage direct current, HV_DC, output from the PFC circuit, into the second voltage (i.e., +20V), and outputs to the motherboard for power supply.

Independent transformers are adopted in the present embodiment, and output the first voltage (+12V) and the second voltage (+20V) separately for power supply, wherein, the +12V and +20V power are independent to each other from the first beginning, thus no matter these two outputs and the PWM controller are working normally or not, they will not affect each other, therefore, avoid the interference caused by the two voltages. Also, due to the total separation of two output voltages, when the load of a circuit in one voltage changes, no affects will happen to the other circuit to output the according voltage, thus the design will further ensure the system stability in normal working status. Especially for an OLED screen, since OLED is lighting due to electric currents driving thin organic films, thus any changes in electric currents will cause changes in screen colors. In the present embodiment, the first voltage and the second voltage, output from the power board, are independent to each other, making the whole device work stably and normally, which effectively improves the electric performances of the product, and improves the picture quality of OLED TV screen, also extends the service lives of the OLED screens.

It should be understood that, the standby circuit 110, the PFC circuit 150, the first PWM controller 131, the second PWM controller 141 are all belonging to the prior technologies, thus their circuits will not be described here in details.

Take a TV set as an example, in practical applications, the display part of a TV set comprises a power board, a motherboard, a TO-CON board and additional boards (i.e. a constant current board, in LED TV sets). Their normal working voltages and currents are provided by the power board, and different boards own different functions, require different powers. In normal working conditions, the power consumptions of a power board, motherboard and screen are different based on their different sizes. Take a 55 inches OLED TV set for an example, the electric voltages supplying to the motherboard, provided by the power board, are +5V, +12V and +20V, and the voltage supplied to the OLED screen is +20V, while the maximum current is around 10A.

Figure 6:
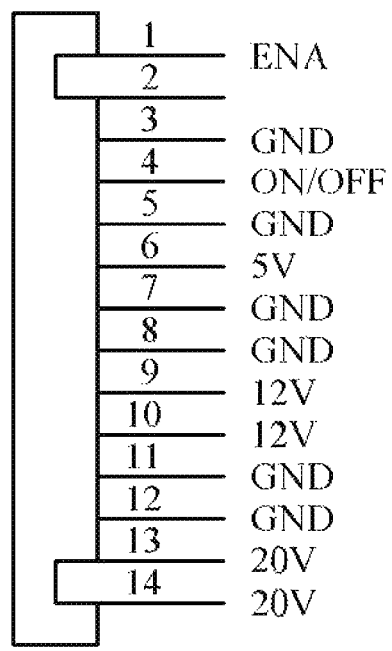
FIG. 6 illustrates the schematic diagram of the socket pins connecting between a power board and a motherboard, as described in an embodiment of the present invention.
Figure 7:
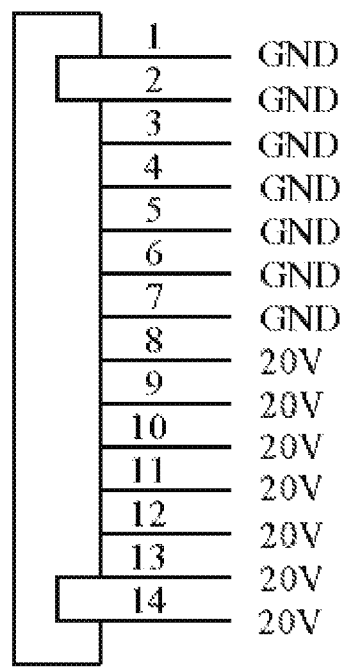
FIG. 7 illustrates the schematic diagram of the socket pins connecting between the power board and a OLED screen, as described in an embodiment of the present invention.

Thus, in the present embodiment, a set of matched first socket are arranged in the power board 10 and the motherboard 20 accordingly, connected by a USB data cable inserting in both the first sockets, and the distribution of socket pins of the first socket are shown in FIG. 6. Combining FIG. 4 and FIG. 6 together, we can see, the interaction data between the power board 10 and the motherboard 20 include: enable signals ENA, switch signals ON/OFF, supply voltage 5V, first power +12V, second voltage +20V and ground GND. Similarly, a set of matched second sockets are arranged in the power board 10 and the OLED screen 30 accordingly, connected by another USB data cable inserting in both the second sockets, and the socket pins distribution of the second socket are shown in FIG. 7. Combining FIG. 4 and FIG. 7, we can see, the interaction data between the power board 10 and the OLED screen 30 include: second voltage +20V and ground GND. The OLED screen is lit up by second voltage +20V. The connections between the motherboard 20 and the OLED screen are also adopting a USB data cable and two sockets; the motherboard 20 outputs first voltage of +12V and supplies to the related controlling circuits of the OLED screen, and controls the display content of the OLED screen through data "Data". In practical implements, the number of the socket pins could be increased or decreased appropriately, subject to the real voltage requirements.

Further, the power switch sequence may be adjusted by the ON/OFF switch signals fed back from the CPU set in the motherboard and the enable signals ENA. Only when both the switch signal ON/OFF and the enable signal ENA are turned on simultaneously, will the OLED screen be lit up, which makes the driving power supply apparatus for OLED fulfill the timing sequence requirements of the OLED screen. In practical implements, the switch sequence is adjusted by a switch timing control circuit, and an enable control circuit.

Figure 8:
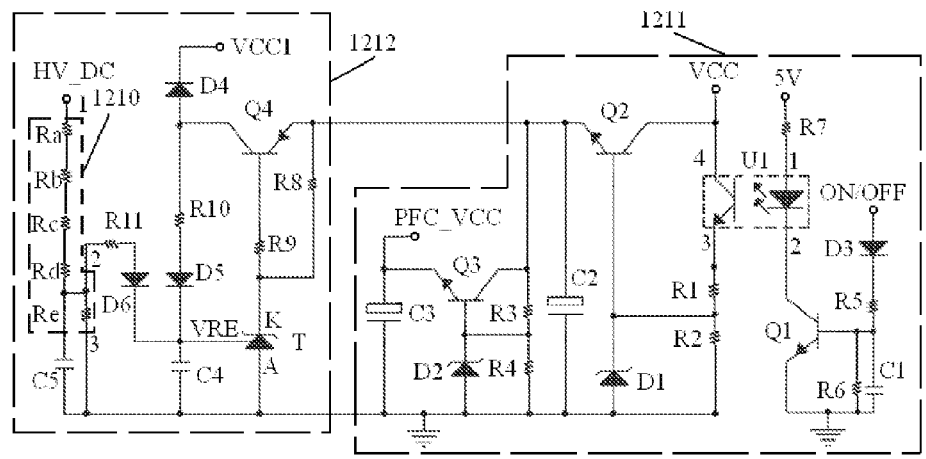
FIG. 8 illustrates a circuit diagram on a switch timing control circuit in an embodiment of the present invention.
Figure 9:
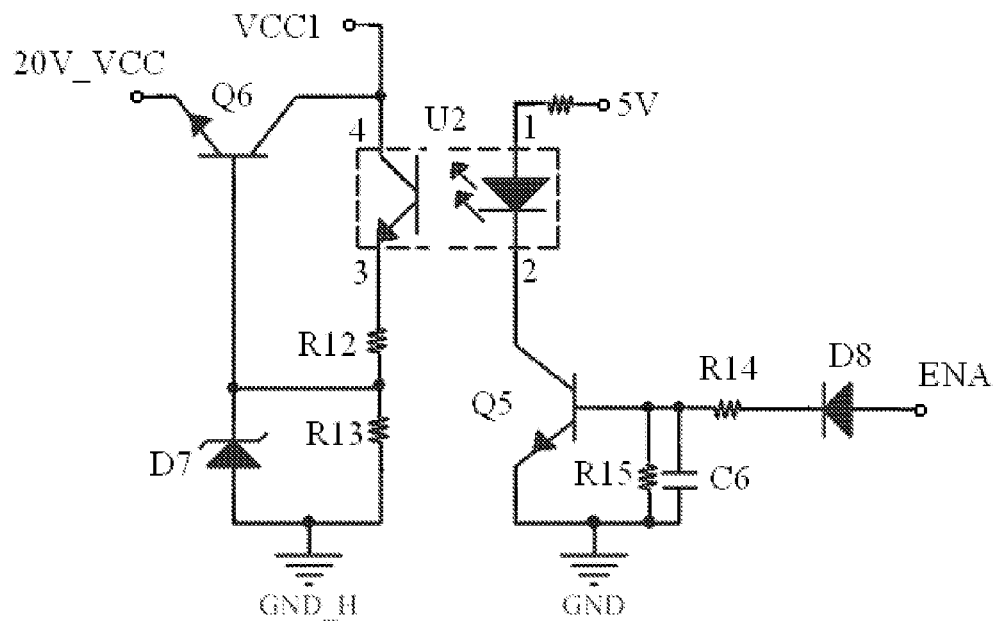
FIG. 9 illustrates a circuit diagram on a enable control circuit as in an embodiment of the present invention.

Further referencing to FIG. 8 and FIG. 9, the first power controller sub circuit 1211 includes: a first triode Q1, a second triode Q2, a third triode Q3, a first OC-U1, a first resistor R1, a second resistor R2, a third resistor R3, a fourth resistor R4, a first diode D1 and a second diode D2. The second power controller sub circuit 1212 includes: a fourth triode Q4, a shunt voltage reference regulator T and a resistance voltage divider (RVD) group 1210.

The base electrode of the first triode Q1 connects to the motherboard (which is applied to input the switch signals ON/OFF), the emitter electrode of the first triode Q1 gets ground connected, and the collector electrode of the first triode Q1 connects to the second pin of the first OC, (U1), (i.e., the cathode of the light emitting diode), while the first pin of U1, the first OC, (i.e., the anode of the light emitting diode) connects to the standby circuit (configured to input the 5V supply voltage), the fourth pin of the first OC, (U1), (i.e., the collector electrode of the phototransistor) connects to the standby circuit and the collector electrode of the second triode Q2, the third pin of the first OC, (U1) (i.e., the emitter electrode of the phototransistor) connects to one end of the first resistor R1, while the other end of the first resistor R1 connects to the base electrode of the second triode Q2 and the cathode of the first diode, as well as getting ground connected through the second resistor R2, the anode of the first diode D1 gets ground connected; the emitter electrode of the second triode Q2 connects to the collector electrode of the third triode Q3, one end of the third resistor R3, and the emitter electrode of the fourth triode Q4; the other end of the third resistor R3 connects to the base electrode of the third triode Q3, the cathode of the second diode D2, and gets ground connected through the fourth resistor R4; the anode of the second diode D2 is ground connected, the emitter electrode of the third triode Q3 connects to the PFC circuit (configured to output the first power PFC_VCC), the base electrode of the fourth triode Q4 connects to the negative electrode K of the shunt voltage reference regulator T; the collector electrode of the fourth triode Q4 connects to the enable control circuit, the first transformer module and the control electrode (VRE) of the shunt voltage reference regulator T (configured to output the second power VCC1); the positive electrode A of the shunt voltage reference regulator gets ground connected, the first end of the RVD group 1210 connects to the PFC circuit (configured to input high voltage direct current, HV_DC), the second end of the RVD group 1210 connects to the control electrode VRE of the shunt voltage reference regulator T, and the third end of the RVD group 1210 gets ground connected. In the present embodiment, the first triode Q1, second triode Q2, third triode Q3 are all NPN type triodes, and the fourth triode Q4 is a PNP type triode. The first diode D1 and the second diode D2 are both Zener diodes, which protects the second triode Q2 and the third triode Q3. The model of the shunt voltage reference regulator T is TL431, which has a break-over voltage 2.5V. The model of the OC-U1 is PC817.

The RVD group 1210 is composed by a plurality of resistors connected in series, in the present embodiment, it contains a first RVD: Ra, a second RVD: Rb, a third RVD: Rc, a fourth RVD: Rd and a fifth RVD: Re. One end of the first RVD, Ra (that is, the first end of the RVD group 1210) connects to the PFC circuit, which is configured to input the high voltage direct current HV_DC. One end of the fifth RVD resistor Re (that is, the third end of the RVD group 1210) gets ground connected. The connection point of the fourth RVD Rd and the fifth RVD Re (that is, the second end of the RVD group 1210) also connects to the control electrode VRE of the shunt voltage reference regulator T.

In specific implements, the first power controller sub circuit 1211 also includes a filter and voltage division circuit, composed by a third diode D3, a fifth resistor R5, a sixth resistor R6 and a first capacitor C1, as well as a seventh resistor R7, which is configured to limit the current. The anode of the third diode D3 connects to the motherboard, and the cathode of the third diode D3 connects to one end of the fifth resistor R5, while the other end of the fifth resistor R5 connects to the base electrode of the first triode Q1, as well as getting ground connected through the sixth resistor R6; the first capacitor C1 connects to the sixth resistor R6 in parallel. The voltage division of the fifth resistor R5 and the sixth resistor R6 is a break-over voltage for the base electrode of the first triode Q1, which decides the conductive status of the first triode Q1, while the first capacitor C1 smoothes and filters the break-over voltage, which improves the stability of the break-over status. The seventh resistor R7 connects in between the standby circuit and the first pin of the first OC, (U1).

The resistances of the first resistor R1, the second resistor R2, the third resistor R3 and the fourth resistor R4 decide the conductive status of the second triode Q2 and the third triode Q3, thus control the voltage of the first power PFC_VCC. In order to stabilize the output of the first power PFC_VCC, the switch timing control circuit also comprises two polar capacitors, that is, a second capacitor C2 and a third capacitor C3, while the cathode of the second capacitor C2 connects to the emitter electrode of the second triode Q2, and the anode of the second capacitor C2 gets ground connected; the cathode of the third capacitor C3 connects to the emitter of the third triode Q3, and the anode of the third capacitor C3 gets ground connected.

In the present embodiment, the second power controller sub circuit 1212 also includes an eighth resistor R8 and a ninth resistor R9, configured to set the offset voltage, and adjust the conduction status of the fourth triode Q4. One end of the eighth resistor R8 connects to the emitter electrode of the fourth triode Q4, and the other end of the eighth resistor R8 connects to the negative electrode K of the shunt voltage reference regulator T and one end of the ninth resistor R9, the other end of the ninth resistor R9 connects to the base electrode of the fourth triode Q4. The resistances of the eighth resistor R8 and the ninth resistor R9 decide the voltage of the second power VCC1.

In order to stabilize the output of the second power VCC1, the second power controller sub circuit 1212 also includes a fourth diode D4, configured to block the direct current and filter, as well as a tenth resistor R10, a fifth diode D5 and a fourth capacitor C4, configured to hysteresis control the shunt voltage reference regulator T keep conducting. The cathode of the fourth diode D4 connects to the enable control circuit and the first transformer module, and the anode of the fourth diode D4 connects to the collector electrode of the fourth triode Q4, as well as the anode of the fifth diode D5 through the tenth resistor R10, the cathode of the fifth diode D5 connects to the controller electrode VRE of the shunt voltage reference regulator T, and the fourth capacitor C4 connects in between the controller electrode VRE of the shunt voltage reference regulator T and the ground.

In order to ensure the stability of the conduction of the shunt voltage reference regulator T, the second power controller sub circuit 1212 also includes a fifth capacitor C5 for filtration, an eleventh resistor R11 for current limitation, and a sixth diode D6, configured to block AC. The fifth capacitor C5 connects to the second end of the RVD group (i.e., connects to the fifth RVD Re in parallel), the cathode of the sixth diode D6 connects to the controller electrode VRE of the shunt voltage reference regulator T, and the anode of the sixth diode D6 connects to the second end of the RVD group 1210 through the eleventh resistor R11.

Shown in FIG. 9, the enable control circuit includes a fifth triode Q5, a sixth triode Q6, a second OC, U2, a twelfth resistor R12, a thirteenth resistor R13 and a seventh diode D7; the base electrode of the fifth triode Q5 connects to the motherboard (configured to input the enable signal ENA), the emitter electrode of the fifth triode Q5 gets ground connected, the collector electrode of the fifth triode Q5 connects to the second pin of the second OC, (U2) (i.e., the cathode of the light emitting diode, LED), the first pin of the second OC, (U2) (i.e., the anode of the LED) connects to the standby circuit (configured to input the 5V supply voltage), the fourth pin of the second OC, (U2) (i.e., the collector electrode of the phototriode) connects to the collector electrodes of the fourth triode Q4 and the sixth triode Q6, the third pin of the second OC, (U2) (i.e., the emitter electrode of the phototriode) connects to one end of the twelfth resistor R12, and the other end of the twelfth resistor R12 connects to the base electrode of the sixth triode Q6, the cathode of the seventh diode D7, as well as getting ground connected through the thirteenth resistor R13, the anode of the seventh diode D7 gets ground connected, the emitter electrode of the sixth triode Q6 connects to the second transformer module (configured to output a third voltage 20V_VCC).

In the present embodiment, the fifth triode Q5 and the sixth triode Q6 both are NPN type triode. The seventh diode D7 is a Zener diode and it could protect the sixth triode Q6. Adjusting the resistance values of the twelfth resistor R12 and the thirteenth resistor R13 will affect the conducting status of the sixth triode Q6, thus controls the voltage value of the third power 20V_VCC.

In order to filter out the outside noises from the enable signals ENA and smooth its waveform, the enable control circuit also includes an eighth diode D8, a fourteenth resistor R14, a fifteenth resistor R15 and a sixth capacitor C6. The anode of the eighth diode D8 connects to the motherboard (configured to input the enable signal ENA), the cathode of the eighth diode D8 connects to one end of the fourteenth resistor R14, the other end of the fourteenth resistor R14 connects to the base electrode of the fifth triode Q5, and gets ground connected through the fifteenth resistor R15, the sixth capacitor C6 connects to the fifteenth resistor R15 in parallel. The partial voltage of the fourteenth resistor R14 and the fifteenth resistor R15 is the break-over voltage of the fifth triode Q5, which decides the conducting status of the fifth triode Q5, the sixth capacitor C6 smoothes and filters the break-over voltage, which will improve the stability of the conducting status.

Continue referencing to FIG. 4 to FIG. 9. When the driving power supply apparatus for OLED connects to an outside AC, the standby circuit 110 outputs +5V power supply to a CPU in the motherboard and the first pin of the first OC, (U1). Also, the standby circuit 110 outputs the work voltage VCC (around 25V) to the fourth pin of the first OC, (U1) and the collector electrode of the second triode Q2 for power supply. When the CPU works normally, it supplies a switch signal ON/OFF to the switch timing control circuit in the power board (it is active at high voltage, similar to the power on signal), and makes the first triode Q1 conducted in saturation. At the same time, the conduction of the first OC, (U1) increases, and its phototriode gets conducted, which raises the voltage of the base electrode of the second triode Q2, and the conduction of the second triode Q2 raises the voltage of the base electrode of the third triode Q3, and makes the third triode Q3 also conducted in saturation. The working voltage VCC gets lower passing through the second triode Q2, the third triode Q3, then outputs the first power PFC_VCC and supply to the PFC circuit.

When the PFC circuit in the power board starts to work, it generates high voltage direct current HV_DC (higher than 380V) and feeds back to the first end of the RVD group 1210. The high voltage direct current HV_DC separates a current with higher than 2.5V voltage after passing through the RVD group 1200, and was sent to the control electrode VRE of the shunt voltage reference regulator, that makes the shunt voltage reference regulator T conduct, and the conduction makes the base electrode of the fourth triode Q4 in a low electric level, and the fourth triode Q4 is conducted. Then the work voltage VCC reduces its voltage value by passing through the second triode Q2 and the fourth triode Q4, then outputs the second power VCC1 to the first transformer module, the first transformer module then converts the second power VCC1 into the first power of +12V and supplies to the motherboard, which makes the motherboard feed back the enable signals ENA to the power board, after working normally. (It is active at high electric levels, similar to light up a screen)

After the enable control circuit in the power board receives the enable signal ENA, the fifth triode Q5 gets conducted, and increases the conduction of the second OC, (U2), raises the base voltage of the sixth triode Q6, and the sixth triode Q6 gets conducted in saturation. Then the second power VCC1 outputs the third power 20V VCC to the second transformer module, after reducing the voltage by the sixth triode Q6, the second transformer module then converts the third power 20V_VCC into the second voltage of +20V and supplies to the motherboard and OLED screen. Then the OLED screen could be lit up. In specific implements, the motherboard will also send a current with the second voltage of +20V to the power amplifier circuit. (This belongs to the prior technology, thus no details are listed here).

When the switch signal ON/OFF is on the low level (similar to the power off signal), the shutdown of the first triode Q1 will turn the first OC, (U1) off, then the second triode Q2, the third triode Q3 will be cut off in sequence. At the moment, there is no first power PFC_VCC output, and the PFC circuit also stops working, then there is no high voltage direct current HV_DC generating, thus the fourth triode Q4 is also cut off, without any output of the second power VCC1, the first transformer module stops working and outputs no first power.

When the enable signal ENA is at a low level, (similar to screen off), the fifth triode Q5 gets cut off, and that makes the second OC, (U2) turned off, and the sixth triode Q6 shut down. Then the third power 20V_VCC becomes low electric level, that makes the second transformer module stop working, thus no second voltage of +20V output and supply to the OLED screen, the OLED screen is then powered off.

Figure 10:
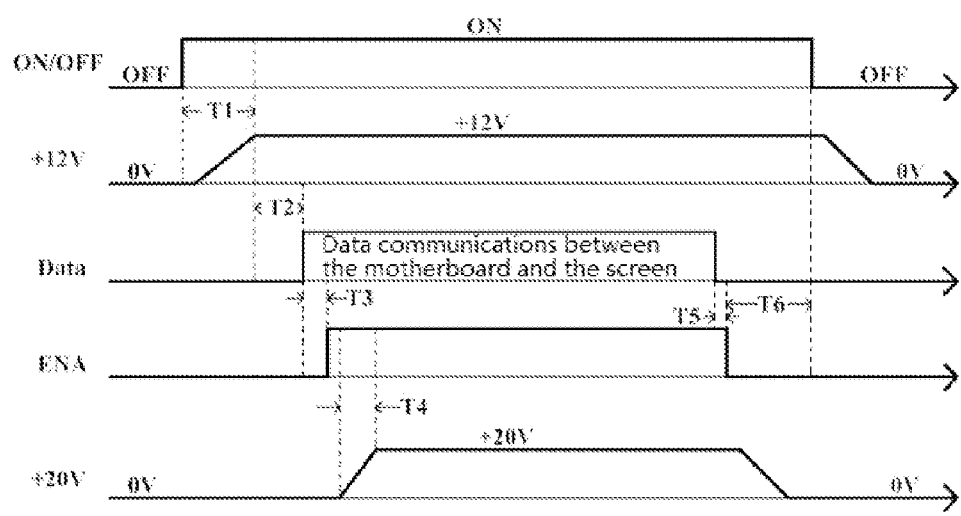
FIG. 10 illustrates the schematic diagram on a switch sequence of the driving power supply apparatus for OLED as provided in an embodiment of the present invention.

The schematic diagram of the switch timing sequence after circuit simulation to the driving power supply apparatus for OLED is shown in FIG. 10. Based on the working principles of the circuit listed above, we can see, after the power board 10 receives switch info feedbacks, ON/OFF, from the motherboard 20, it will control the first transformer module 130 output the first voltage, +12V, to the motherboard 20. After a time period, about T1, the first voltage becomes stable, the motherboard 20 starts to work, and after a time period T2, the motherboard 20 sends data "Data" to the OLED screen, since there is no second voltage +20V here, the OLED screen has not been lit up. After another time period T3, the motherboard 20 sends the enable signal ENA back to the power board 10, after the enable control circuit receives the enable signal ENA, the second transformer module 140 will be controlled to output the second voltage of +20V to the motherboard and OLED screen. After a period of T4, the second voltage will become stable and be output, now the OLED screen will be lit up, and start working, check a data "Data" and display it. The time period from the start of +12V voltage to the start of +20V voltage is no less than 36 ms (T1+T2+T3+T4).

When powered off, the motherboard will send a low level enable signal ENA (similar to the turn-off signal) to the power board, the power board will stop outputting the second voltage of +20V, the OLED screen will be shut off. Then, after waiting for a period T6, the motherboard 20 will send a low level switch signal ON/OFF (low level means power-off signal), the power board will stop outputting the first voltage of +12V, and the whole apparatus enters a standby status. The period of T6, as in the present embodiment, is no less than 30 ms. Therefore, turning on/off the OLED screen will not coincide with that of the motherboard, thus avoid the problem of blurred screens.

In summary, the driving power supply apparatus for OLED discloses in the present invention, after connected to the AC power, the standby circuit in the power board will output a 5V power to the CPU in the motherboard, after the CPU work normally, it will feed the switch signal ON/OFF back and start the switch timing control circuit in the power board, output the first power PFC_VCC and start the PFC circuit, then the high voltage direct current output from the PFC circuit makes the switch timing control circuit output the second power VCC1 to the first transformer module and convert into +12V voltage, while supplying the enable control circuit; after the power board outputs +12V voltage to the motherboard, the motherboard will feed the enable signal ENA back to the enable control circuit, and make it output the third power 20V_VCC to the second transformer module and convert into +20V voltage, the power board then outputs a voltage of +20V and lights the OLED screen up.

Since the first and second transformer modules are adopting isolated voltage transformers and output +12V and +20V voltage separately, the output and control of these two voltages are separated from each other, and will not affect each other, thus the interference problem between the two voltages due to sharing the voltage transformer in the prior technology, can be avoid. Also, since the outputs of the two voltages are totally separated, thus if the load in one line changes, the voltage output from the other line still will not be affected, and this makes the whole device work normally and stably, effectively improves the electric performance of the product, improves the quality experiences of the OLED TV sets, and extends the service life of the OLED screen.

Also, in the present invention, the OLED screen will not be lit up until both the switch signals and the enable signals are stable at the same time before a voltage of +20V is output, that has changed the switch sequence of a traditional power design and made the power adapt to the fast response characters of OLED, solved the problem of blurred screens due to the switch sequence changing simultaneously.

It should be understood that, the application of the present invention is not limited to the above examples listed. Ordinary technical personnel in this field can improve or change the applications according to the above descriptions, all of these improvements and transforms should belong to the scope of protection in the appended claims of the present invention.

What is claimed is:

1. A driving power supply apparatus for OLED comprises a power board connecting to both a motherboard and an OLED screen, wherein, the power board comprises: a standby circuit, a timing control module, a first transformer module, a second transformer module and a PFC circuit;

the standby circuit is configured to output a power at supply voltage to the motherboard then supply the timing control module after connecting to an outside power source;

the timing control module starts the PFC circuit based on a switch signal fed back from the motherboard, and the PFC circuit outputs a high voltage direct current (HVDC) to the timing control module, the first transformer module and the second transformer module;

then the timing control module will turn on the first transformer module and the second transformer module, based on the HVDC signals output from the PFC circuit together with an enable signal, wherein, the first transformer module converts the HVDC into a first voltage before supplying to the motherboard, and the second transformer module is configured to convert the HVDC into a second voltage before supplying to the motherboard and the OLED screen;

the timing control module also controls start sequences of both the first transformer module and the second transformer module, and lights the OLED screen up after both the switch signal and the enable signal are stable concurrently.

2. The driving power supply apparatus for OLED according to claim 1, wherein, the first transformer module comprises:

a first PWM controller, configured to turn on a first transformer, based on a second power output from the switch timing control circuit;

the first transformer, configured to convert the HVDC output from the PFC circuit into the first voltage, then output to the motherboard for power supply;

the first transformer connects to the first PWM controller and the motherboard, while the first PWM controller connects to the timing control module.

3. The driving power supply apparatus for OLED according to claim 1, wherein, the second transformer module comprises:

a second PWM controller, configured to start a second transformer, based on a third power output from the enable control circuit;

the second transformer, configured to convert the HVDC output from the PFC circuit into the second voltage, then output to the motherboard for power supply;

the second transformer connects to the second PWM controller and the motherboard, while the second PWM controller connects to the timing control module.

4. A driving power supply apparatus for OLED comprises a power board connecting to both a motherboard and an OLED screen, wherein, the power board comprises: a standby circuit, a timing control module, a first transformer module, a second transformer module and a PFC circuit;

the standby circuit is configured to output a power at supply voltage to the motherboard then supply the timing control module after connecting to an outside power source;

the timing control module starts the PFC circuit based on a switch signal fed back from the motherboard, and the PFC circuit outputs a high voltage direct current (HVDC) to the timing control module, the first transformer module and the second transformer module;

then the timing control module will turn on the first transformer module and the second transformer module, based on the HVDC signals output from the PFC circuit together with an enable signal, wherein, the first transformer module converts the HVDC into a first voltage before supplying to the motherboard, and the second transformer module is configured to convert the HVDC into a second voltage before supplying to the motherboard and the OLED screen;

the timing control module also controls the start sequences of both the first transformer module and the second transformer module, and lights the OLED screen up after both the switch signal and the enable signal are stable concurrently;

the timing control module further comprises:
  a switch timing control circuit, configured to output a first power and turn on the PFC circuit based on the switch signal fed back from the motherboard, and output a second power to an enable control circuit and the first transformer module for power supplies, based on the HVDC output from the PFC circuit;
  the enable control circuit, configured to output a third power to the second transformer module for supply, based on the enable signal fed back from the motherboard;
  the switch timing control circuit connects to the PFC circuit, the enable control circuit, the first transformer module and the motherboard, while the enable control circuit connects to the second transformer module.

5. The driving power supply apparatus for OLED according to claim 4, wherein, the first transformer module comprises:
  a first PWM controller, configured to turn on a first transformer, based on a second power output from the switch timing control circuit;
  the first transformer, configured to convert the HVDC output from the PFC circuit into the first voltage, then output to the motherboard for power supply;
  the first transformer connects to the first PWM controller and the motherboard, while the first PWM controller connects to the timing control module.

6. The driving power supply apparatus for OLED according to claim 4, wherein, the second transformer module comprises:
  a second PWM controller, configured to start a second transformer, based on a third power output from the enable control circuit;
  the second transformer, configured to convert the HVDC output from the PFC circuit into the second voltage, then output to the motherboard for power supply;
  the second transformer connects to the second PWM controller and the motherboard, while the second PWM controller connects to the timing control module.

7. The driving power supply apparatus for OLED according to claim 4, wherein, the standby circuit is further configured to output a working voltage to the switch tinning control circuit, after connected to a power;
  the switch timing control circuit comprises:
    a first power controller sub circuit, configured to convert the working voltage output from the standby circuit into a first power and turn on the PFC circuit, based on the switch signals fed back from the motherboard;
    a second power controller sub circuit, configured to convert the working voltage into the second power and supplies to the enable control circuit and the first transformer module, based on the HVDC output from the started PFC circuit;
  the first power controller sub circuit connects to the standby circuit, the motherboard, the PFC circuit and the second power controller sub circuit, while the second power controller sub circuit connects to the PFC circuit, the enable control circuit and the first transformer module.

8. The driving power supply apparatus for OLED according to claim 7, wherein, the first power controller sub circuit comprises: a first triode, a second triode, a third triode, a first opticalcoupler (OC), a first resistor, a second resistor, a third resistor, a fourth resistor, a first diode and a second diode;
  the base electrode of the first triode connects to the motherboard, the emitter electrode of the first triode gets ground connected, and the collector electrode of the first triode connects to the second pin of the first OC, while the first pin of the first OC connects to the standby circuit, the fourth pin of the first OC connects to the standby circuit and the collector electrode of the second triode, the third pin of the first OC connects to one end of the first resistor, while the other end of the first resistor connects to the base electrode of the second triode and the cathode of the first diode, as well as getting ground connected through the second resistor, the anode of the first diode gets ground connected, the emitter electrode of the second triode connects to the collector electrode of the third triode, one end of the third resistor connects to the second power controller sub circuit, the other end of the third resistor connects to the base electrode of the third triode, the cathode of the second diode, and gets ground connected through the fourth resistor, the anode of the second diode is ground connected, the emitter electrode of the third triode connects to the PFC circuit.

9. The driving power supply apparatus for OLED according to claim 7, wherein, the second power controller sub circuit comprises: a fourth triode, a shunt voltage reference regulator and a resistance voltage divider (RVD) group;
  the base electrode of the fourth triode connects to the negative electrode of the shunt voltage reference regulator, the collector electrode of the fourth triode connects to the enable control circuit, the first transformer module and the controller electrode of the shunt voltage reference regulator, the emitter electrode of the fourth triode connects to the first power controller sub circuit, the positive electrode of the shunt voltage reference regulator gets ground connected, the first end of the RVD group connects to the PFC circuit, and the second end of the RVD group connects to the controller electrode of the shunt voltage reference regulator, the third end of the RVD gets ground connected.

10. The driving power supply apparatus for OLED according to claim 8, wherein, the first power controller sub circuit further comprises: a third diode, a fifth resistor, a sixth resistor, a first capacitor and a seventh resistor;
  the anode of the third diode connects to the motherboard, and the cathode of the third diode connects to one end of the fifth resistor, while the other end of the fifth resistor connects to the base electrode of the first triode, and gets ground connected through the sixth resistor, the first capacitor and the sixth resistor connects in parallel, the seventh resistor connects in between the standby circuit and the first pin of the first OC.

11. The driving power supply apparatus for OLED according to claim 9, wherein, the second power controller sub circuit further comprises an eighth resistor and a ninth resistor;
  one end of the eighth resistor connects to the emitter electrode of the fourth triode, while the other end of the eighth resistor connects to the negative electrode of the shunt voltage reference regulator and one end of the ninth resistor, while the other end of the ninth resistor connects to the base electrode of the fourth triode.

12. The driving power supply apparatus apparatus for OLED according to claim 9, wherein, the second power controller sub circuit also comprises a fourth diode, a tenth resistor, a fifth diode and a fourth capacitor;

the cathode of the fourth diode connects to the enable control circuit and the first transformer module, the anode of the fourth diode connects to the collector electrode of the fourth triode and the anode of the fifth diode through the tenth resistor, the cathode of the fifth diode connects to the controller electrode of the shunt voltage reference regulator, the fourth capacitor connects in between the ground and the controller electrode of the shunt voltage reference regulator.

13. The driving power supply apparatus for OLED according to claim 9, wherein, the second power controller sub circuit also comprises a fifth capacitor, an eleventh resistor and a sixth diode;

the fifth capacitor connects to the second end of the RVD group, the cathode of the sixth diode connects to the controller electrode of the shunt voltage reference regulator, and the anode of the sixth diode connects to the second end of the RVD group through the eleventh resistor.

14. The driving power supply apparatus for OLED according to claim 9, wherein, the enable control circuit comprises a fifth triode, a sixth triode, a second OC, a twelfth resistor, a thirteenth resistor and a seventh diode;

the base electrode of the fifth triode connects to the motherboard, the emitter electrode of the fifth triode gets ground connected, and the collector electrode of the fifth triode connects to the second pin of the second OC, the first pin of the second OC connects to the standby circuit, the fourth pin of the second OC connects to the second power controller sub circuit and the collector electrode of the sixth triode, the third pin of the second OC connects to one end of the twelfth resistor, while the other end of the twelfth resistor connects to the base electrode of the sixth triode, the cathode of the seventh diode, and gets ground connected through the thirteenth resistor;

the anode of the seventh diode gets ground connected, the emitter electrode of the sixth triode connects to the second transformer module.

* * * * *